Jan. 15, 1952  H. E. GREENE  2,582,426
VARIABLE RATE SPRING SUSPENSION
Filed Oct. 18, 1947
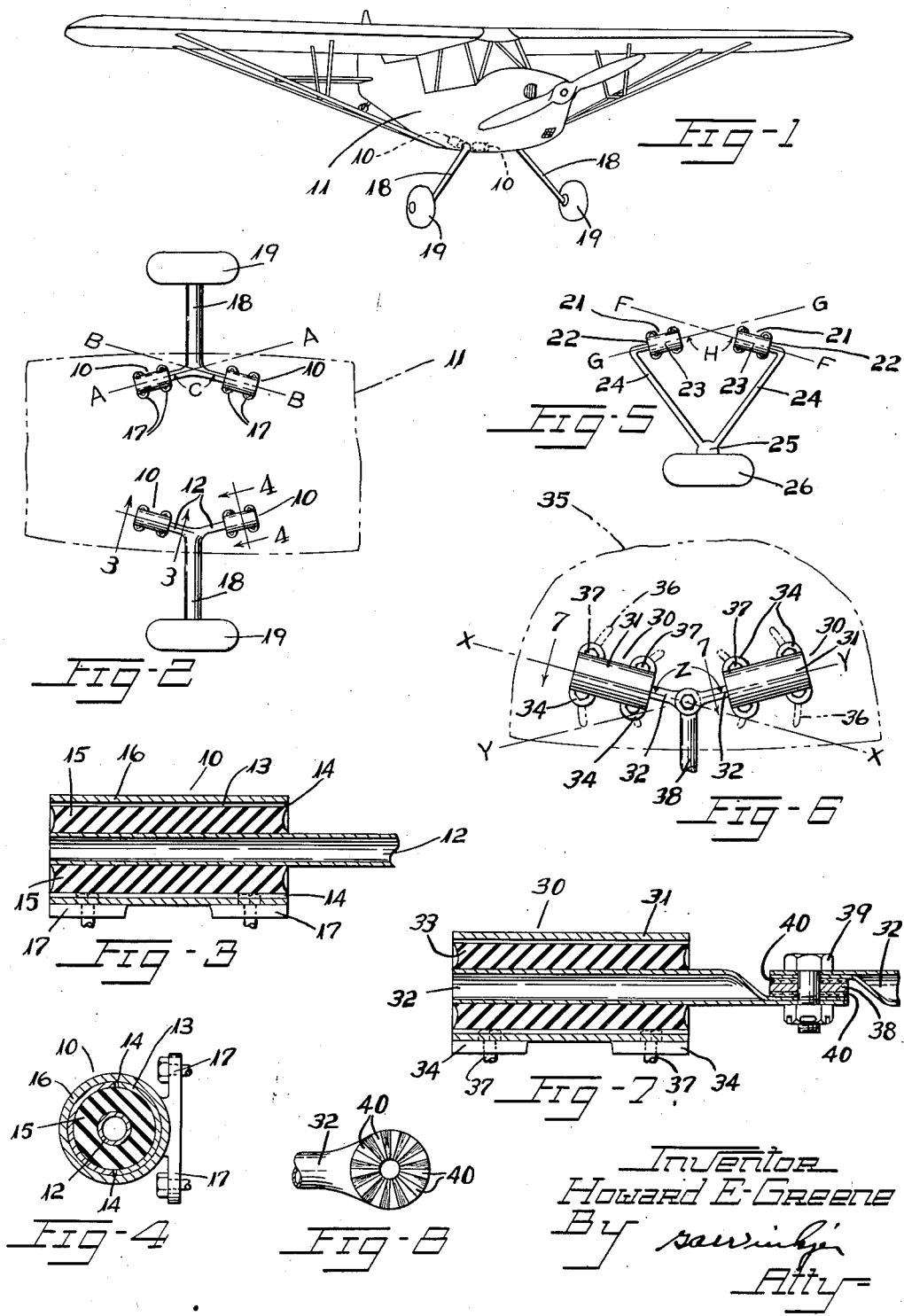

UNITED STATES PATENT OFFICE 2,582,426

VARIABLE RATE SPRING SUSPENSION

Howard E. Greene, Shaker Heights, Ohio, assignor to The B. F. Goodrich Company, New York, N. Y., a corporation of New York Application October 18, 1947, Serial No. 780,657

8 Claims. (Cl. 267—63)

This invention relates to spring suspensions and especially to suspensions in which it is desirable to have a variable spring rate or moduli to provide soft springing under some conditions of operation and stiff springing under other conditions of operation. Spring suspensions with variable rates are desirable for example in airplanes to provide soft springing for taxiing and increased stiffness of springing for cushioning the impact forces to which they are subjected in landing.

Spring suspensions for applications such as in airplanes can advantageously use springs having non-linear stress-strain characteristics. Variable moduli spring suspensions proposed heretofore in which the change in modulus has been obtained by adding or eliminating the resistance of a spring have involved mechanical complications and moreover have not utilized all the springing material during the entire range of operation so that consequently the weights of the spring suspensions have been high in proportion to the cushioning provided.

A rubber torsion spring of the type in which a cylinder of rubber is interposed between an inner shaft and an outer sleeve has very nearly a uniform spring modulus, measured for example in inch-pounds per degree twist, over the useful range of spring deflection when the cylinder of rubber is twisted in circumferential shear by the relative rotation of the shaft and sleeve. It is an object of this invention to provide a rubber torsion spring that has a variable modulus within the useful range of the spring, and further to provide for effecting the change in modulus in various ways, for example by a progressive increase in the modulus throughout the range of increased deflection, or alternatively by a reduction in the modulus throughout a part of the range and an increased modulus throughout another part of the range.

Other objects of the invention are to provide an improved spring suspension capable of soft springing action with small deflection and in which the spring modulus increases with greater spring deflection, to provide a spring suspension which will effectively cushion a body subjected both to large and to small impact forces, to provide a variable modulus spring suspension in which all the elements function during the entire operation, to provide a spring suspension in which the spring modulus may be changed by making adjustments to the relative positions of the suspension parts, to provide improved means for maintaining a spring in a preloaded condition, to provide an improved spring suspension for airplane landing gear, and to provide for convenience in manufacture and installation.

These and other objects will be apparent from the following description, reference being had to the accompanying drawings in which:

Fig. 1 is a perspective view of an airplane incorporating a landing gear suspension constructed in accordance with and embodying the invention.

Fig. 2 is a plan view of the landing gear shown in Fig. 1, the airplane fuselage being shown in dot-dash lines.

Fig. 3 is a section taken along line 3—3 in Fig. 2.

Fig. 4 is a section taken along line 4—4 in Fig. 2.

Fig. 5 is a plan view of a modified construction.

Fig. 6 is a plan view of another modification, parts being broken away.

Fig. 7 is a section taken along line 7—7 in Fig. 6.

Fig. 8 is a plan view of the end portion of a spring shaft, parts being broken away.

If a rubber torsion spring be deflected by relative rotation without tilting of the shaft therein small loads may be accommodated with large deflections. If the same spring be deflected by tilting the shaft without relative rotation large loads are required for small deflections. In the first case the spring is subjected to forces principally in circumferential shear while in the second case of generally increased stiffness the rubber acts largely in compression. In accordance with the invention means are provided for compelling tilting as well as rotating movement of the shaft and the sleeve, one relative to the other, upon deflection of the spring, and the spring is constructed in a manner such that the characteristics found in both cases discussed hereinabove may be combined to give a variable spring modulus.

The light airplane shown in Fig. 1 is suitable for operation on small airports which often have rough, unimproved landing surfaces and it is desirable to provide in such cases for strong and effective spring suspensions.

The suspension shown in Figs. 1 and 2 comprises torsion springs 10, 10 which are mounted on and preferably within the outer surfaces of a supported structure such as fuselage 11 to reduce drag and increase the aerodynamic efficiency of the airplane. As shown in Figs. 3 and 4 the torsion springs 10, 10 which may be of light construction and size each comprises an inner supporting member such as shaft 12 and an outer supported member such as sleeve 13 which may be circumferentially discontinuous with longitudinal slots 14, 14. A body of resilient rubber or other rubber-like material 15 is mounted between the shaft 12 and the discontinuous sleeve 13 and may be suitably bonded to the shaft and sleeve as by vulcanization. An outer circumferentially continuous sleeve 16 is disposed about the discontinuous sleeve 13 in a manner such that relative motion of the sleeves 13 and 16 is prevented. Outwardly extending lugs 17, 17 are mounted on each outer sleeve 16, 16 and may be used to attach the spring to the airplane.

In accordance with the invention, torsion springs 10, 10 are mounted on the fuselage 11 with spring axes A—A and B—B as shown in Fig. 2, in non-coaxial disposition and preferably at an angle C to each other. The shafts 12, 12 are connected to each other and to supporting structures such as struts 18, 18 upon which wheels 19, 19 are mounted. The spring shafts 12, 12 of the suspension shown in Figs. 1 and 2 are connected to the struts 18, 18 in the proximity of the fuselage 11 which provides a construction which is strong and compact.

In operation, upon displacement of the wheels 19, 19 relative to the fuselage 11 each spring shaft 12 is rotated relative to the adjacent discontinuous sleeve 13 and the intervening body of resilient material 15 is stressed in circumferential shear when the load on the airplane is increased. Upon deflection of the springs 11, 11 the spring shafts 12, 12 are tilted as well as turned in the discontinuous sleeves 13, 13 because the angle C between the spring axes A—A and B—B prevents simple coaxial rotation of the shafts in the sleeves. Turning the tilting of the shafts 12, 12 relative to the discontinuous sleeves 13, 13 stresses the intervening bodies of resilient rubber-like material 15, 15 in radial compression as well as in circumferential shear. The resistance of the bodies of rubber-like material 15, 15 of the springs 11, 11 to compression in addition to their resistance to shear causes the stress-strain characteristics of the springs to depart from a linear relationship and provides variable spring moduli. The non-linear spring stress-strain characteristics attained with this construction are very desirable in an airplane suspension because the spring moduli will increase as the deflection increases and smoothly abate the force of impact imposed upon the airplane.

With the same pair of springs 11, 11 a variety of stress-strain characteristics may be obtained. As the angle C between the axes A—A and B—B of the springs 11, 11 is reduced the stiffness of the spring assembly will increase because the amount of tilting of the shafts 12, 12 in the sleeves 13, 13 will be greater. As the angle C is increased, the stiffness of the spring will be reduced as the tilting will be decreased.

The deflection of springs embodying the invention is limited by the tilting of the shafts 12, 12 in the sleeves 13, 13. As the spring deflects from the non-tilt position because of an increase or decrease of the forces imposed thereon, the shafts 12, 12 tilt and move in a path which converges with the sleeves 13, 13. As the deflection increases the cushioning bodies of resilient rubber or other rubber-like material 15, 15 will be compressed by the tilting until further motion of the shafts 12, 12 will be stopped by the resistance of the cushioning bodies and the walls of sleeves 13, 13.

It is desirable that the shafts 12, 12 be in the non-tilt position under normal load in order that soft springing may be provided with small deflection. To attain this condition the springs 11, 11 are prewound or preloaded an amount such that when the normal load is applied the spring will be stressed until the non-tilt position of equilibrium is reached and the resistance of the cushioning bodies 15, 15 in shear will equal the forces imposed upon the spring by the normal load. Heretofore when springs have been preloaded extra stops have been required to maintain the springs in the preloaded condition when no load was imposed on the spring. It can be seen that with the spring of the invention the spring is not permitted to unwind beyond the position at which the preloaded circumferential shear stress equals the compression stress caused by tilting of the shaft 12 in the sleeve 13. Consequently, no extra provision need be made to prevent unwinding.

Features of the invention may be applied to suspensions other than that of Figs. 1 and 2. In Fig. 5 a modified construction embodying the invention is shown which has two torsion springs 21, 21 comprising inner and outer members with intervening cushioning bodies of resilient rubber or other rubber-like material 22, 22 which may be mounted therein in a manner such as is shown in Fig. 4 by vulcanization or by other suitable means. Outer members of the springs 21, 21 such as sleeves 23, 23 are mounted on a supported structure such as an airplane fuselage in non-coaxial disposition with axes F—F and G—G at an angle H to each other. The inner members of the springs 21, 21 such as shafts 24, 24 extend outwardly in opposite directions from the springs and are connected to a supporting structure such as strut 25 in the proximity of wheel 26 which is mounted on the strut. The shafts 24, 24 and strut 25 provide a substantially stiff structure and when moved by forces on the wheel 26 relative to the airplane fuselage tend to rotate and tilt the shafts relative to the sleeves 23, 23, stressing the intervening cushioning bodies 22, 22 simultaneously in shear and in compression. Because of this compound stressing of the cushioning bodies 22, 22 the suspension provides variable modulus springing.

Another modification of the invention is shown in Figs. 6, 7 and 8. A pair of torsion springs 30, 30 having outer members such as sleeves 31, 31 and inner members such as shafts 32, 32 with intervening cushioning bodies of resilient rubber or other rubber-like material 33, 33 shown in Fig. 7 which may be mounted therein by suitable means such as vulcanization are disposed in non-coaxial relationship with axes X—X and Y—Y intersecting at an angle Z. The sleeves 31, 31 have lugs 34, 34 for securing the sleeves to a supported structure such as an airplane fuselage member 35. The fuselage member 35 has slots 36, 36 aligned with the lugs 34, 34 in a manner such that bolts 37, 37 may be passed through holes in the lugs and through the slots to mount the springs 30, 30 adjustably on the fuselage member 35.

The slots 36, 36 in the fuselage member 35 permit movement of the springs 30, 30 to change the angle Z between the spring axes X—X and Y—Y. The springs 30, 30 may be adjusted to a desired angle Z and secured to the fuselage member 35 at that position by bolts 37, 37.

Each spring shaft 32 extends generally toward and is connected to the other spring shaft and to a supporting structural member such as a strut 38 by a bolt and nut assembly 39 which is disposed in aligned holes in the shafts 32, 32 and strut 38. As shown in Figs. 7 and 8 the shafts 32, 32 and strut 38 have interlocking abutting surfaces which may be serrated with serrations 40, 40 extending radially from the aligned holes in the shafts 32, 32 and strut 38. When the springs 30, 30 are moved in the slots 36, 36 and the angle Z is changed, the serrations 40, 40 of the shafts 32, 32 and strut 38 may be disengaged by releasing the bolt and nut assembly 39. When the desired angle Z is attained the shafts 32, 32 and strut 38 may be clamped together by the bolt and nut assembly 39 and the serrations 40, 40 of the members meshed in interlocking engagement. Upon movement of the strut 38 relative to the fuselage member 35 the strut and shafts 32, 32 will maintain the same angular relationship and the shafts 32, 32 will be tilted as well as turned in the springs 30, 30 to stress the cushioning body in compression and in circumferential shear to obtain a variable spring modulus.

As heretofore discussed, the spring characteristics may be altered by changing the angle Z between the spring axes X—X and Y—Y. Increasing the angle Z decreases the amount of tilting of the shafts 33, 33 in the sleeves 32, 32 and causes a smaller change in the spring modulus during a given deflection, while decreasing the angle Z increases the tilting of the shaft and causes a greater change in the spring modulus during a given deflection. It can be seen that a variety of spring characteristics may be attained by adjusting the angle Z without changing parts or the construction of the suspension.

Variations may be made without departing from the scope of the invention as it is defined in the following claims.

I claim:

1. A spring suspension comprising a supported structure, a supporting structure, a pair of torsion springs disposed between said structures, each of said torsion springs comprising an annular outer member mounted on said supported structure and an inner member connected to said supporting structure and movable relative to said outer member, a body of resilient rubber-like material mounted between said members to cushion relative movement thereof, said springs being disposed with their axes intersecting at an angle and each of said inner members being connected to said supporting structure for relative turning movement and relative tilting movement of said members upon relative movement of said structures to stress the resilient rubber-like bodies of said springs in rotational shear and also in radial compression to provide changing spring rates under relative movement of said structures.

2. A spring suspension comprising supported and supporting structures, torsion springs disposed between said structures, each of said torsion springs comprising inner and outer members movable one relative to the other, and a body of resilient rubber-like material mounted between said inner and outer members to cushion relative movement thereof, said torsion springs being disposed with their axes at an inclination one with relation to the other, one member of each spring being mounted on one of said structures and the other member of each spring being mounted on the other of said structures for relative turning movement and also for relative tilting movement of said members upon relative movement of said structures to stress the resilient rubber-like bodies of said torsion springs in rotational shear and also in radial compression to provide a varying spring rate under relative movement of said structures.

3. A spring suspension comprising supported and supporting structures, torsion springs disposed between said structures, each of said torsion springs comprising inner and outer members movable one relative to the other, and a body of resilient rubber-like material mounted between said inner and outer members to cushion relative movement thereof, said torsion springs being disposed with their axes at an inclination one with relation to the other, each of the outer members being mounted on one of said structures and each of the inner members being connected to the other of said structures for relative turning movement and also for relative tilting movement of said members upon relative movement of said structures to stress the resilient rubber-like bodies of said torsion springs in rotational shear and also in radial compression to provide a varying spring rate under relative movement of said structures.

4. A spring assembly for connecting a pair of relatively movable bodies, an arm structure pivotally mounted on one of said bodies at spaced-apart positions on the latter for swinging movement of said arm structure upon relative movement of said bodies, one of the pivotal connections comprising inner and outer members and an intervening body of resilient rubber-like material, one of said members being mounted on one of said bodies and the other of said members being mounted on said arm structure for stressing said body of resilient rubber-like material in rotational shear upon swinging movement of said arm, the other of the pivotal connections being disposed for constraining swinging movement of said arm structure in a direction to compel relative tilting movement of said members to stress said body also in a manner other than in the rotational shear and provide a spring rate determined by the composite of the stressing movements of the members.

5. A spring assembly for connecting a pair of relatively movable bodies, an arm structure pivotally mounted on one of said bodies at spaced-apart positions on the latter for swinging movement of said arm structure upon relative movement of said bodies, one of the pivotal connections comprising coaxial inner and outer members and an intervening body of resilient rubber-like material, one of said members being mounted on one of said bodies and the other of said members being mounted on said arm structure for stressing said body of resilient rubber-like material in rotational shear upon swinging movement of said arm structure, the other of said connections including a pivotal joint having an axis inclined to the axis of said members for constraining swinging movement of said arm structure in a direction other than about the axis of said members to compel tilting movement of said members to stress said body also in a manner other than in the rotational shear and provide a spring rate determined by the composite of the stressing movements of the members.

6. A spring assembly for connecting a pair of relatively movable bodies, an arm structure, a pair of torsion springs for pivotally mounting said arm structure on one of said bodies for swinging movement of said arm structure upon relative movement of said bodies, each of said torsion springs comprising inner and outer members movable one relative to the other and an intervening body of resilient rubber-like material for cushioning relative movement thereof, said torsion springs being disposed with their axes at an inclination one with relation to the other, one of the members of each spring being mounted on one of the bodies and the other member of each spring being mounted on said arm structure for swinging movement of said arm structure and for relative turning movement and also for relative tilting movement of said members to stress the bodies of resilient rubber-like material in rotational shear and also in radial compression to provide a varying spring rate under relative movement of said bodies.

7. A spring assembly for connecting a pair of relatively movable bodies, an arm structure, a pair of torsion springs for pivotally mounting said arm structure on one of said bodies for swinging movement of said arm structure upon relative movement of said bodies, each of said torsion springs comprising inner and outer members movable one relative to the other and an intervening body of resilient rubber-like material for cushioning relative movement thereof, said torsion springs being disposed with their axes at an inclination one with relation to the other, one of the members of each spring being mounted on one of said bodies and the other member of each spring being mounted on said arm structure for swinging movement of said arm structure and for relative turning movement and also for relative tilting movement of said members to stress the bodies of resilient rubber-like material in rotational shear and also in radial compression to provide a varying spring rate under relative movement of said bodies and adjusting means to vary the degree of inclination between the axes of said springs to vary the amount of change in spring rate under a given deflection.

8. A spring assembly for connecting a pair of relatively movable bodies, an arm structure bifurcated to provide two branches, a pair of torsion springs for pivotally mounting said arm structure on one of said bodies for swinging movement of said arm structure upon relative movement of said bodies, each of said torsion springs comprising inner and outer members movable one relative to the other and an intervening body of resilient rubber-like material for cushioning relative movement thereof, said torsion springs being disposed with their axes at an inclination one with relation to the other, one member of each spring being mounted on said structure and the other member of one of said springs being mounted on one branch of said arm and the other member of the other of said springs being mounted on the other branch of said arm for swinging movement of said arm structure and resulting relative turning movement and relative tilting movement of said members to stress the bodies of resilient rubber-like material in rotational shear and also in radial compression to provide a variable spring rate upon relative movement of said bodies.

HOWARD E. GREENE.

REFERENCES CITED

The following references are of record in the file of this patent:

UNITED STATES PATENTS

| Number | Name | Date |
|---|---|---|
| 1,919,033 | Noble | July 18, 1933 |
| 2,112,981 | Best | Apr. 5, 1938 |
| 2,305,795 | Schieferstein | Dec. 22, 1942 |

FOREIGN PATENTS

| Number | Country | Date |
|---|---|---|
| 793,615 | France | Apr. 30, 1936 |
| 487,468 | Great Britain | June 21, 1938 |